United States Patent [19]

Machida

[11] Patent Number: 5,736,634
[45] Date of Patent: Apr. 7, 1998

[54] APPARATUS AND METHOD FOR DETECTING COMBUSTION CONDITIONS OF AN INTERNAL COMBUSTION ENGINE

[75] Inventor: Kenichi Machida, Atsugi, Japan

[73] Assignee: Unisia Jecs Corporation, Kanagawa-ken, Japan

[21] Appl. No.: 643,916

[22] Filed: May 7, 1996

[30] Foreign Application Priority Data

May 10, 1995 [JP] Japan .................. 7-111642

[51] Int. Cl.⁶ .................. G01M 15/00
[52] U.S. Cl. .................. 73/117.3
[58] Field of Search .................. 73/116, 117.3; 123/419, 436; 364/431.08, 431.07

[56] References Cited

U.S. PATENT DOCUMENTS

| | | | |
|---|---|---|---|
| 4,932,379 | 6/1990 | Tang et al. | 73/117.3 |
| 5,361,629 | 11/1994 | McCombie | 73/117.3 |
| 5,387,253 | 2/1995 | Remboski, Jr. et al. | 73/117.3 |
| 5,440,921 | 8/1995 | Matsuno et al. | 73/117.3 |
| 5,481,909 | 1/1996 | Deutsch et al. | 73/117.3 |
| 5,548,995 | 8/1996 | Clinton et al. | 73/117.3 |
| 5,561,600 | 10/1996 | McCombie | 73/117.3 |
| 5,574,217 | 11/1996 | McCombie | 73/117.3 |

FOREIGN PATENT DOCUMENTS 5-17172   3/1993   Japan.

*Primary Examiner*—George M. Dombroske
*Assistant Examiner*—Eric S. McCall
*Attorney, Agent, or Firm*—Lowe, Price, LeBlanc & Becker

[57] ABSTRACT

Top dead center (TDC) is obtained by counting the number of unit angle signals from a reference angle signal for each cylinder, and combustion conditions of the engine are then detected based on fluctuations in the period of the top dead center. Here the unit angle signals occurring from after the reference angle signal until the TDC following the subsequent reference angle signal are counted, and the count number of the unit angle signals from after the reference angle signal until when the TDC is obtained, is modified based on a difference between the counted number and a reference value.

20 Claims, 4 Drawing Sheets

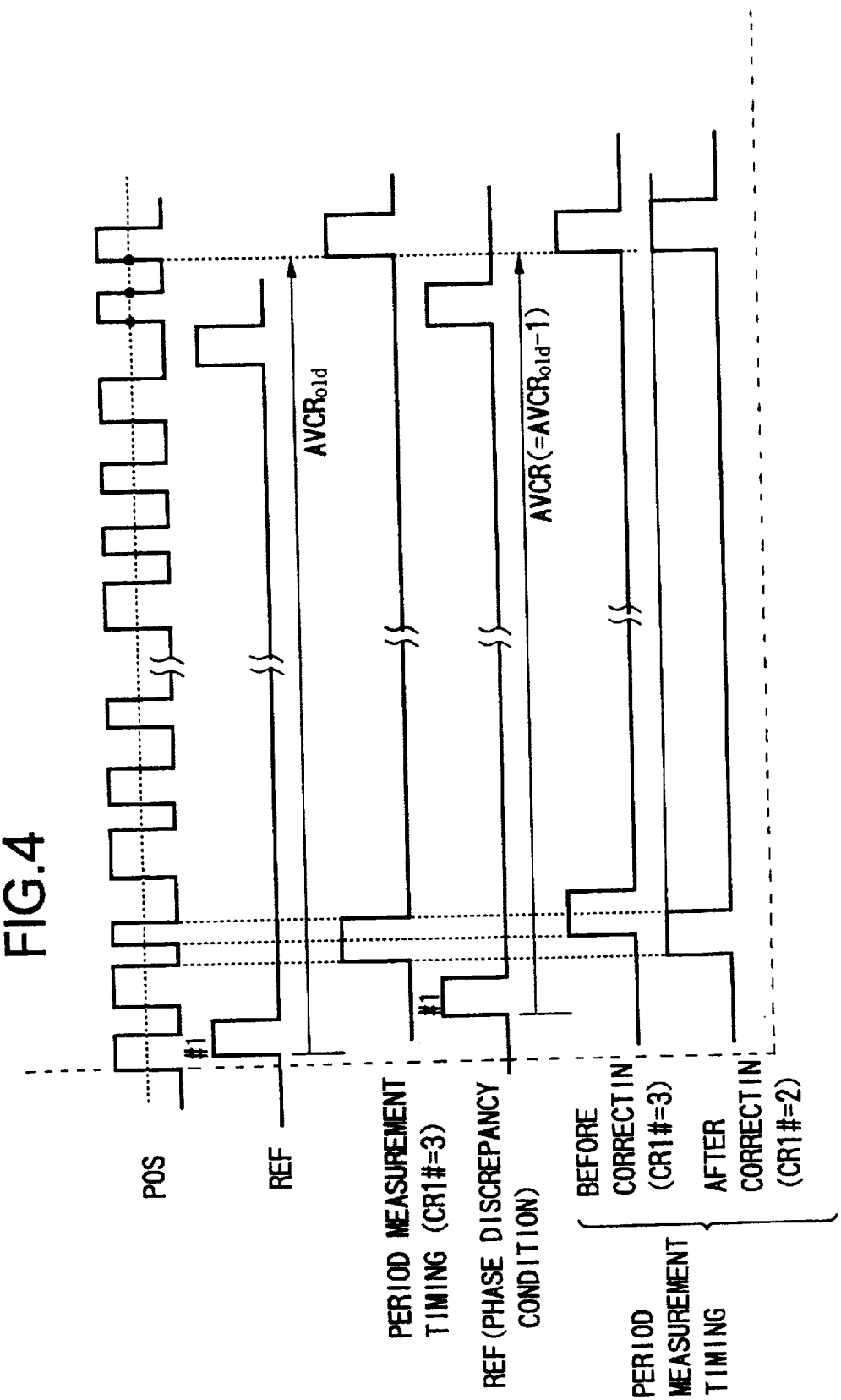

APPARATUS AND METHOD FOR DETECTING COMBUSTION CONDITIONS OF AN INTERNAL COMBUSTION ENGINE

FIELD OF THE INVENTION

The present invention relates to an apparatus and method for detecting combustion conditions of an internal combustion engine, based on fluctuations in engine angular speed.

RELATED ART OF THE INVENTION

Heretofore, a known apparatus for detecting the combustion conditions of an engine, detects a predetermined crank angle range of the engine using a crank angle sensor, measures the period of the detected predetermined crank angle range, and then determines engine combustion conditions based on the measurement results for the period (refer to Japanese Unexamined Utility Model Publication No. 5-17172).

The method of detecting the predetermined crank angle range, uses a reference angle signal REF output for example for each 70° BTDC from a sensor fitted to a cam shaft, and a unit angle signal POS output from an electromagnetic pickup which detects the flywheel ring gear teeth. In this case the top dead center (TDC) is detected by counting the unit angle signals POS with the reference angle signal REF as a reference, and the period is measured with the top dead center interval as a predetermined crank angle range.

Normally the construction is such that the rotation of the crank shaft is transmitted to the cam shaft by means of a timing chain or a timing belt, so that the cam shaft is a follower. Therefore in the case as mentioned above wherein the reference angle signal REF is taken out from the cam shaft and the unit angle signal POS is taken out from the ring gear of the flywheel fitted to the crank shaft, then due to stretching of the chain or the belt, a phase discrepancy occurs in the unit angle signal POS relative to the reference angle signal REF.

Moreover, since there are variations in the shape of the respective teeth of the ring gear, then variations unrelated to angular speed, occur in the generation period of the unit angle signal POS obtained by detecting the ring gear teeth.

Therefore, when the crank angle range is detected as described above, by measuring the period by counting the unit angle signals POS with the reference angle signal REF as a reference, when the TDC is detected based on a fixed count number, the detected position for the TDC can be at different angles for the respective cylinders due to the phase discrepancy. As a result there is the possibility of variations in the angles of the intervals for measuring the period (the period measurement intervals), causing a drop in the detection accuracy of the combustion conditions based on the detection results for the period.

SUMMARY OF THE INVENTION

The present invention takes into consideration the above situation, with the object of being able to avoid the occurrence of period measurement error caused by the phase discrepancy between the reference angle signal REF taken off from the cam shaft and the unit angle signal POS taken off from the crank shaft, to thereby avoid a drop in detection accuracy of the combustion conditions.

Moreover it is an object to effect appropriate correction in order to compensate for the occurrence of the period measurement errors.

In order to achieve the above objectives, the apparatus and method according to the present invention for detecting combustion conditions of an internal combustion engine is constructed with a unit angle signal taken out from a crank shaft for each unit crank angle, and a reference angle signal taken out from a cam shaft for each reference piston position, and one period measurement timing for each generation interval of the reference angle signal is set by counting a predetermined number of the unit angle signals with the reference angle signal as a reference. The combustion conditions of the engine are then detected based on measurement results for the generation period of the period measurement timing. Here the count number of the unit angle signals occurring from after the reference angle signal until the period measurement timing set following the subsequent reference angle signal is obtained, and the count number of the unit angle signals used for setting the period measurement timing is modified corresponding to a difference between the obtained count number and a reference value.

With such a construction, any phase discrepancy between the reference angle signal and the unit angle signal is detected by comparing the count number of the unit angle signal occurring from after the reference angle signal until the period measurement timing set following the subsequent reference angle signal, with the reference value. Then the setting characteristics for the period measurement timing are modified corresponding to this phase discrepancy, so that the occurrence of a period measurement error due to the phase discrepancy can be avoided.

Here the construction may be such that an average value is used for the count number of the unit angle signal compared with the reference value.

With such a construction, stable correction control can be effected without influence from slight changes in the phase discrepancy occurring between the reference angle signal and the unit angle signal.

Moreover, the reference value may be the count number occurring during a previous engine operation.

With such a construction, the phase discrepancy for each engine operation can be detected based on the phase conditions of the reference angle signal and the unit angle signal which differ for individual engines.

Furthermore, the construction may be such that when a difference occurs between the reference value and the actual count number, then the period measurement results until then are cleared.

With such a construction, then in the case where a phase discrepancy is detected based on a difference between the reference value and the actual count number, the period measurement results until then are cleared, so that the period measured prior to detecting the phase discrepancy is not used in detection of the combustion conditions. Therefore when the combustion conditions are detected based on time series stored data of the period measurement results, erroneous detection of the combustion conditions based on the measurement results for a wrong period measurement interval can be prevented.

Preferably, the top dead center is set as the period measurement timing.

With such a construction, any reduction in angular speed due to misfire can be suitably captured as a period fluctuation.

Moreover, the construction may be such that the unit angle signal for each unit crank angle is detected by detecting the teeth on the ring gear of a flywheel.

With such a construction, the unit angle signal can be simply obtained without the need for a special section to be detected for outputting the unit angle signal.

Furthermore, the modification of the count number of the unit angle signals used for setting the period measurement timing may be carried out by adding the result of subtracting a reference value from the count number of the unit angle signals occurring from after the reference angle signal until the period measurement timing set following the subsequent reference angle signal.

With such a construction, then in the case for example where the count number of the unit angle signals occurring from after the reference angle signal until the period measurement timing set following the subsequent reference angle signal is reduced, it can be assumed that the count number from after the subsequent reference angle signal until the period measurement timing is accurately detected, and hence for the period measurement interval, only the angle corresponding to the portion with the reduced count number will be reduced. The period measurement timing with the reference angle signal as a reference, is therefore advanced to match the reduction, so that the angular variations in the period measurement interval due to the phase discrepancy can be suppressed.

Moreover, modification of the count number of the unit angle signals used for setting the period measurement timing is preferably carried out only when the absolute value of the difference between the reference value and the count number of the unit angle signals occurring from after the reference angle signal until the period measurement timing set following the subsequent reference angle signal is one.

With such a construction, correction is only carried out following a change in the phase discrepancy of one count of the unit angle signal. Hence wasteful correction is avoided for the case of a phase discrepancy of two or more counts, which can be regarded as an unexpected phenomena.

Moreover, the construction may be such that the count number of the unit angle signals used for setting the period measurement timing for each reference angle, is individually modified for each reference angle signal.

With such a construction, a desired crank angle position can be set as the period measurement timing with the respective reference angle signal as a reference, in spite of non angular speed related variations in the generation periods of the unit angle signals, due for example to dimensional variations in the portion to be detected.

Other objects and aspects of the present invention will become apparent from the following description of embodiments given in conjunction with the appended drawings.

BRIEF DESCRIPTION OF THE DRAWINGS

FIG. 4 is a time chart showing the characteristics of correction control in the embodiment.

DESCRIPTION OF THE PREFERRED EMBODIMENTS

Figure 1:
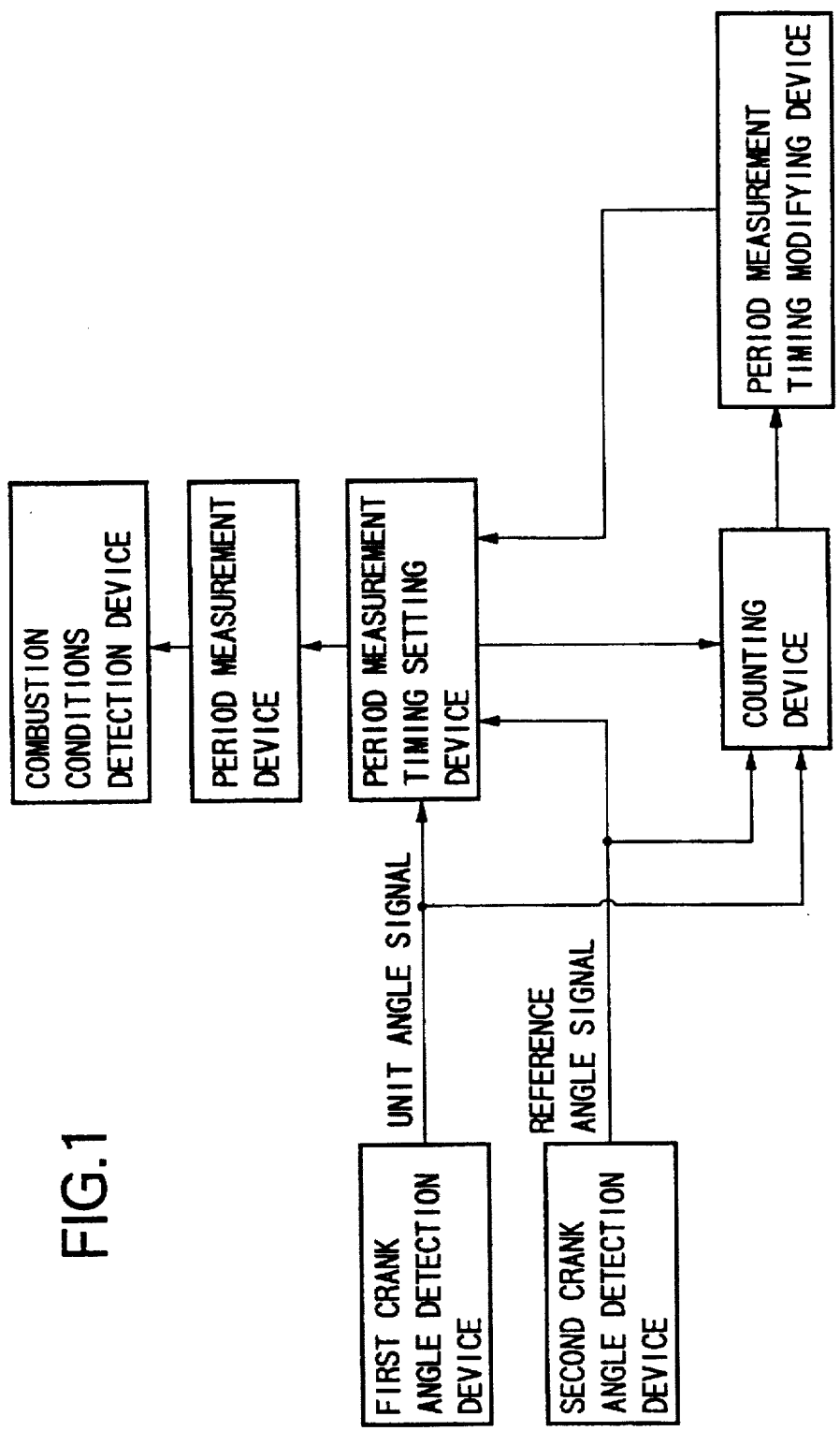
FIG. 1 is a basic block diagram of an apparatus according to the present invention for detecting combustion conditions of an internal combustion engine.

FIG. 1 is a block diagram showing a basic construction of an apparatus according to the present invention for detecting combustion conditions of an internal combustion engine. In FIG. 1, a first crank angle detection device is for taking out from a crank shaft a unit angle signal for each unit crank angle. For example for outputting the unit angle signal by detecting the ring gear of a flywheel. On the other hand, a second crank angle detection device is for taking out from a cam shaft to which the rotation of the crank shaft is transmitted by means of a timing chain or a timing belt, a reference angle signal for each reference piston position.

A period measurement timing setting device sets one period measurement timing for each generation interval of the reference angle signal, by counting a predetermined number of the unit angle signals with the reference angle signal as a reference. The period measurement timing is preferably made top dead center.

Furthermore, a period measurement device measures the generation period of the period measurement timing, that is to say, measures the top dead center period in the case where the period measurement timing is made top dead center. Moreover a combustion conditions detection device detects the combustion conditions of the engine based on the period measured by the period measurement device.

A counting device, counts the generation number of unit angle signals occurring from after the reference crank angle signal until the period measurement timing set following the subsequent reference angle signal. A period measurement timing modifying device then modifies the count number of the unit angle signals used for setting the period measurement timing in the period measurement timing setting device, corresponding to a difference between the number of unit angle signals counted by the counting device, and a reference value, to thereby compensate for fluctuations in the period measurement interval caused by a phase discrepancy between the reference angle signal and the unit angle signal.

As follows is a description of a basic embodiment of an apparatus and method having the abovementioned basic construction, for detecting combustion conditions of an internal combustion engine.

Figure 2:
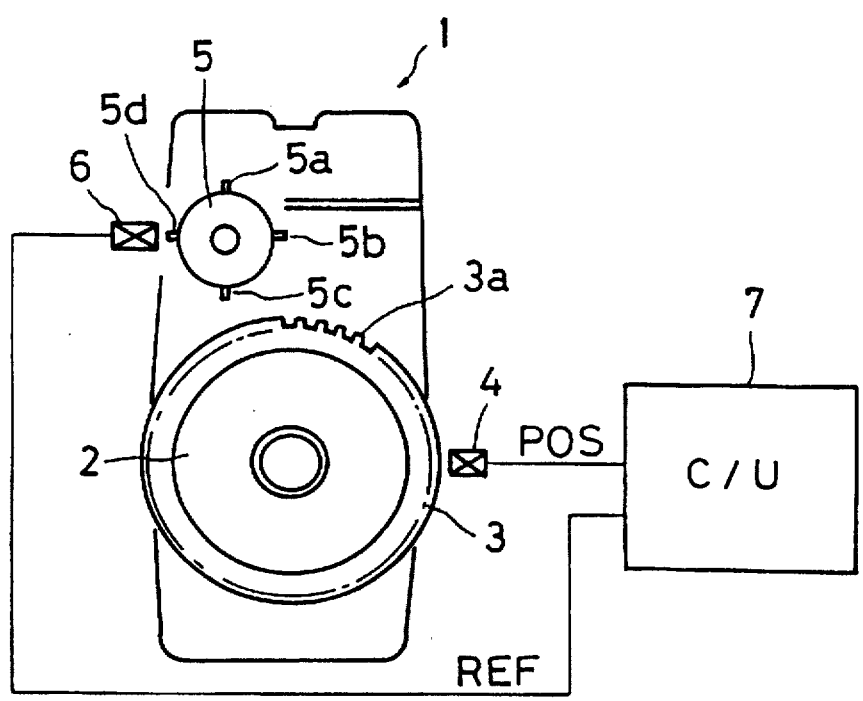
FIG. 2 is a system schematic diagram of an internal combustion engine of an embodiment.

In FIG. 2 showing a system configuration of the embodiment, a four cycle four cylinder internal combustion engine 1 has a flywheel 2 axially supported on a crank shaft (not shown in the figure), and to which is fixedly secured a ring gear 3. A starter motor (not shown in the figure) engages with the ring gear 3 to thereby start the motor.

An electromagnetic pickup 4 is provided for detecting each of 120 teeth 3a provided on the ring gear 3 at each 3° crank angle. The construction is such that the magnetically open end of the electromagnetic pickup 4 is opened and closed by the teeth 3a of the ring gear 3 with rotation of the crank shaft so that an induced EMF pulse is obtained for each 3° crank angle. A unit angle signal POS is thus taken out from the crank shaft for each 3° crank angle, by means of the electromagnetic pickup 4 (first crank angle detection device).

On the other hand, a signal disc plate 5 for obtaining a reference angle signal REF, is supported on a cam shaft (not shown in the figure) which rotates once every two rotations of the crank shaft. Four protrusions 5a–5d are respectively provided on the periphery of the signal disc plate 5 evenly spaced at 90° so as to correspond to a crank angle of 180° (the stroke phase difference between cylinders).

An electromagnetic pickup 6 is provided for detecting the four protrusions 5a–5d. The construction is such that the magnetically open end of the electromagnetic pick up 6 is opened and closed by the protrusions 5a–5d with rotation of the cam shaft so that an induced EMF pulse is obtained for each 180° crank angle. A reference angle signal REF is thus taken out from the cam shaft for each 180° crank angle, by means of the signal disc plate 5 and the electromagnetic pickup 6 (second crank angle detection device).

The signal disc plate 5 is supported on the cam shaft with the angular position aligned relative thereto so that the protrusions 5a~5d are detected by the electromagnetic pickup 6a at 70° before top dead center (BTDC) of the respective cylinders (reference piston position). Moreover, with the protrusions 5a~5d, the protrusion detected by the electromagnetic pickup 6 for 70° BTDC of the compression stroke of the #1 cylinder, is formed wider in the rotation direction than the other protrusions. Hence the reference angle signal REF corresponding to 70° BTDC of the compression stroke of the #1 cylinder can be specified, enabling correspondence of the respective angle signals REF with the respective cylinders.

The second crank angle detection device however is not limited to an electromagnetic pickup type sensor, and instead of providing protrusions 5a~5d on the signal disc plate 5, the construction may include slits formed therein, with the slits being detected by means of an optical sensor comprising a light emitting element and a light receiving element, to thereby take out the reference angle signal REF.

The output from the electromagnetic pickup 4 and the electromagnetic pickup 6, that is to say the unit angle signal POS and the reference angle signal REF, are input to a control unit 7. The control unit 7 then detects the combustion conditions of the engine based on these detection signals.

Basically, the respective cylinder top dead centers (TDC) are detected by counting a predetermined number of unit angle signals POS (a number corresponding approximately to 70 crank angle degrees) with the respective reference angle signal REF as a reference, and the detected TDC is then set as one period measurement timing in a generation interval of the reference angle signal REF (period measurement timing setting device). Counting of the unit angle signals POS is carried out by counting each time the value of the unit angle signal crosses a predetermined intermediate value.

A TDC period TINT is then measured (period measurement device), and combustion conditions, in particular whether or not there is misfire, are detected based on changes in the period TINT (combustion conditions detection device). Basically, as disclosed in Japanese Unexamined Utility Model Publication No. 5-17172, a misfire judgement value MISA (for example MISA={3×(T4−T5)+T4−T1)}/T5$^3$) is computed based on time series data for the TDC period TINT (T1~T5; new data being expressed with the smaller symbol), and the presence or absence of misfire is judged by comparing the misfire judgement value MISA with a misfire judgement level.

In the case as described above wherein the reference angle signal REF is taken out from the cam shaft, and the unit angle signal POS is taken out from the ring gear 3 (crank shaft), then a phase discrepancy of the unit angle signal POS relative to the reference angle signal REF can occur. Moreover, due to mechanical deviations in the ring gear, then variations can also occur in the generation periods of the unit angle signals POS. Due to the phase discrepancy, variations can thus occur in the TDC detection position for each cylinder, and in the angles of the period measurement interval (refer to FIG. 4).

Figure 3:
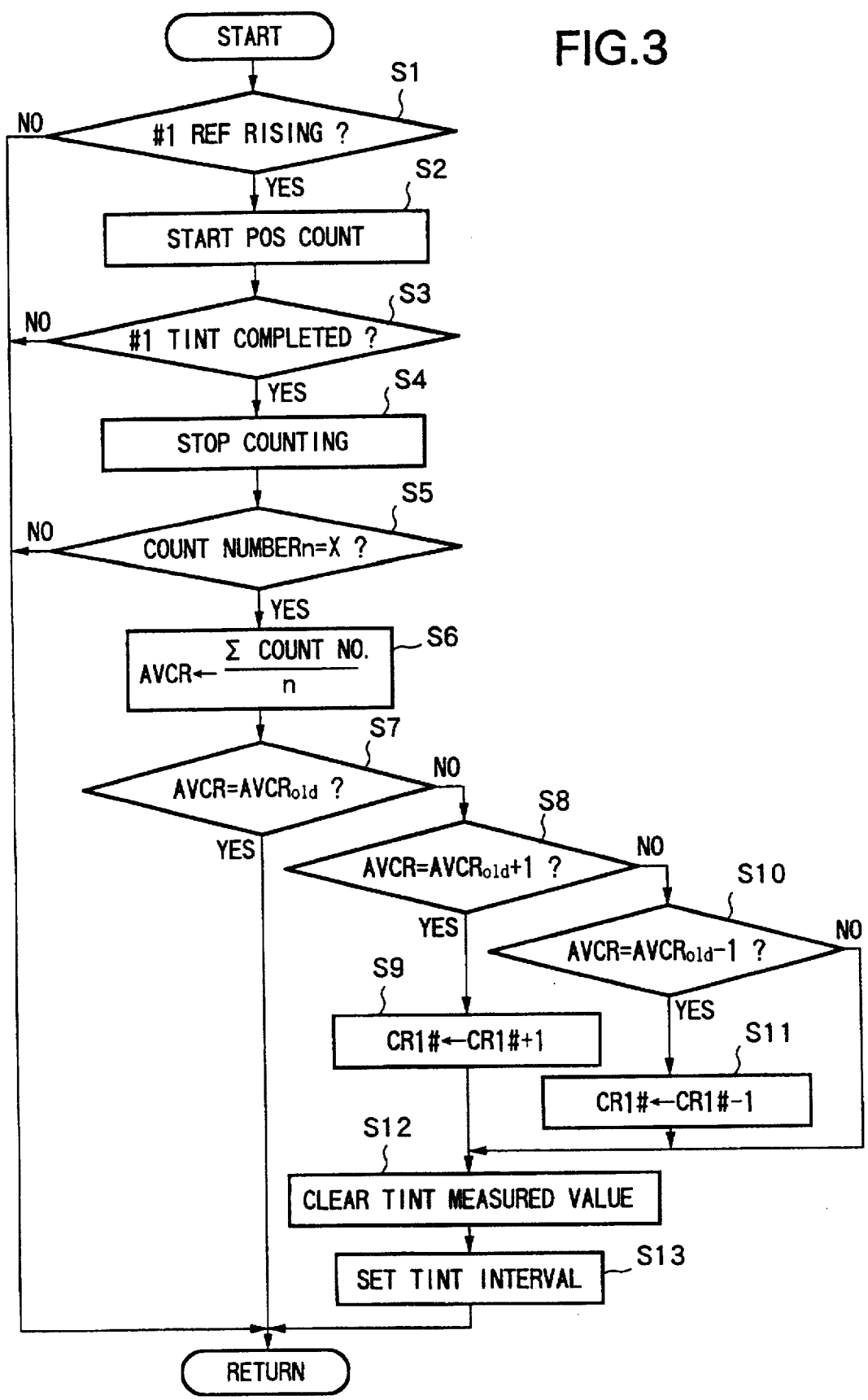
FIG. 3 is a flow chart showing a correction control routine of the embodiment, for correcting a period measurement interval.

With the present embodiment as illustrated by the flow chart of FIG. 3, deterioration in period measurement accuracy caused by the phase discrepancy is avoided. With the embodiment, the functions of the counting device, the period measurement timing modifying device, the count number averaging device, and the period clearing device are realized by software illustrated by the flow chart of FIG. 3 and stored in the control unit 7.

The flow chart of FIG. 3 illustrates a correction control routine for the period measurement timing (TDC) set with the reference angle signal corresponding to the #1 cylinder as a reference. However the period measurement timing based on the reference angle signal corresponding to another cylinder, can also be corrected by a similar control routine.

Initially in step 1 (with "step" denoted by S in the figure) it is judged if the reference angle signal REF corresponding to the #1 cylinder has risen.

When the reference angle signal REF corresponding to the #1 cylinder is generated, control proceeds to step 2 where counting of the unit angle signal POS is started.

In step 3, it is judged if a period measurement interval [#1 TINT] corresponding to the #1 cylinder, from after starting counting has been completed. At the point in time when the period measurement interval [#1 TINT] is completed, control proceeds to step 4 and counting is terminated.

That is to say, with the abovementioned control, the unit angle signals POS are counted during the interval from generation of the reference angle signal REF corresponding to the #1 cylinder until the TDC of the cylinder in the next ignition sequence measured with the subsequent reference angle signal REF as a reference (refer to FIG. 4).

In step 5, it is judged whether or not a number of cycles n of counting the unit angle signal POS has reached a predetermined number of cycles X. If X has not been reached, the routine is terminated as is.

If X has been reached, control proceeds to step 6 where an average number AVCR (refer to FIG. 4) of the count number within the number of cycles X is computed. By using the average of the count numbers for each counting in this way, instead of merely using the count number as is, then instability of the correction control as described later, due to the influence of small changes in the phase condition can be avoided.

In step 7, it is judged whether or not the count number AVCR is the same as a count number AVCRold for a previous operating time. Since the count number AVCR varies depending on the individual engine, then if as mentioned before the data for the previous operating time is made a reference, then effectively, control corresponding to the crank angle detection characteristics peculiar to the individual engine is possible. The count number AVCRold occurring in the previous operating time corresponds to the reference value.

In the case wherein the count number AVCR is the same as the value AVCRold for the previous operating time, it can be assumed that there is no phase discrepancy between the reference angle signal REF and the unit angle signal POS. Therefore, the routine is terminated as is without carrying out correction of the period measurement interval.

On the other hand, when judged that the count number AVCR differs from the previous value AVCRold, control proceeds to step 8 where it is judged if the current count number AVCR is one greater than the previous value AVCRold.

If the count number AVCR has increased by one, control proceeds to step 9 where modification is carried out to increase by one the count value Cr1# of the unit angle signal POS used for measuring the compression TDC of the #1 cylinder from the reference angle signal REF of the #1 cylinder. Then in step 12, all of the accumulated measurement results for the period TINT corresponding to the #1 cylinder are cleared. Subsequently in the next step 13, a period measurement interval (period measurement timing) is detected based on the new increasingly set count number Cr1#, and the period TINT then set.

With the period measurement interval set based on the updated count value Cr1#, the angle change due to the phase discrepancy occurring between the reference angle signal REF and the unit angle signal POS is corrected, and hence the period measurement accuracy is maintained. Moreover, by clearing the period measurement results, it is possible to avoid erroneous detection of combustion conditions, based on period measurement results in an erroneous measurement interval, and to avoid erroneous learning of fluctuations in a fluctuation learning procedure to be described later.

Now referring back to step 8, if judged that the count number AVCR has not increased by one, control proceeds to step 10.

In step 10, if judged that the count number AVCR is only one smaller than the previous value AVCRold, control proceeds to step 11 where modification is carried out to reduce by one the count number CR1# of the unit angle signal POS used for measuring the compression TDC of the #1 cylinder from the reference angle signal REF of the #1 cylinder. Control then proceeds to step 12. Consequently, in this case, the period measurement interval (period measurement timing) is detected based on the new reducingly set count value CR1#, and the period TINT then set for the resultant period measurement interval.

Moreover, when judged in step 10 that the count number AVCR is not one smaller than the previous value AVCRold, control proceeds to step 12 without carrying out correction of the count value CR1#.

That is to say, when the count number AVCR is not equal to the previous AVCRold±1 but differs by two or more, this is assumed to be an unexpected case, and since it is possible to return to the previous value AVCRold+1, then the count number AVCR is again detected without carrying out immediate updating of the count number CR1#.

With the above construction, then as shown for example in FIG. 4, in the case where a current phase discrepancy relative to the phase condition of the previous operating time occurs so that the count number AVCR is reduced by one from the previous time, modification is carried out to reduce the count number Cr1# by one. As a result, the timing from after the reference angle signal REF of the #1 cylinder until the compression TDC of the #1 cylinder is advanced by one unit angle signal POS thereby correcting the timing in a direction to widen the period measurement interval. Therefore effectively, the angular variations in the period measurement interval can be suppressed. Hence combustion conditions detection accuracy based on the detection results for the period TINT can be maintained.

The construction may be such that the modification control of the period measurement interval based on the count number AVCR is carried out during detection of the actual combustion conditions. Moreover the construction may be such that this is carried out in a fluctuation learning procedure during fuel cut-off.

With the fluctuation learning procedure during fuel cut-off, a correction coefficient is learned for each separate cylinder so as to make the actual period TINT conform to a period TINT which is assumed to change at a constant speed under a predetermined deceleration operation at the time of non combustion during fuel cut-off. The period TINT used in misfire detection is then corrected using the correction coefficient learned for each cylinder during fuel cut-off.

In the case where the change speed of the period TINT is obtained using the change in the period TINT for the #1 cylinder as a reference, and learning is carried out assuming that the period TINT corresponding to the other cylinders changes with this change speed, then the control routine shown in FIG. 3 is executed. Since the period measurement interval for the #1 cylinder is properly corrected, then if the change proportion is specified, the learning can be carried out to a high accuracy without influence from the phase discrepancy between the reference angle signal REF and the unit angle signal POS.

What is claimed is:

1. An apparatus for detecting combustion conditions of an internal combustion engine comprising:

first crank angle detection means for taking out from a crank shaft, a unit angle signal for each unit crank angle, second crank angle detection means for taking out from a cam shaft, a reference angle signal for each reference piston position, period measurement timing setting means for setting one measurement timing period for each generation interval of said reference angle signal, by counting a predetermined number of said unit angle signals with said reference angle signal as a reference, period measurement means for measuring the generation period of said period measurement timing, combustion condition detection means for detecting the combustion conditions of the engine based on the period measured by said period measurement means, counting means for counting a generation number of said unit angle signals occurring from after said reference angle signal until the period measurement timing set following the subsequent reference angle signal, and period measurement timing modifying means for modifying the count number of said unit angle signals used for setting the period measurement timing in the period measurement timing setting means, corresponding to a difference between the number of unit angle signals counted by said counting means, and a reference value; and wherein said period measurement timing modifying means adds the results of subtracting a reference value from the number of the unit angle signals counted by said counting means, to the count number of said unit angle signals in said period measurement timing setting means.

2. An apparatus for detecting combustion conditions of an internal combustion engine according to claim 1, wherein a count number averaging means is provided for computing an average value of the number of unit angle signals counted by said counting means, and said period measurement timing modifying means modifies the count number of said unit angle signals in said period measurement timing setting means, corresponding to a difference between the average value of the count number computed by said count number averaging means, and a reference value.

3. An apparatus for detecting combustion conditions of an internal combustion engine according to claim 1, wherein the reference value in said period measurement timing modifying means is the number of said unit angle signals counted by said counting means during a previous engine operation.

4. An apparatus for detecting combustion conditions of an internal combustion engine according to claim 1, wherein a period clearing means is provided for clearing the accumulated period measurement results from said period measurement means, when a difference occurs between the number of unit angle signals counted by said counting means, and a reference value.

5. An apparatus for detecting combustion conditions of an internal combustion engine according to claim 1, wherein said period measurement timing setting means sets the top dead center as the period measurement timing.

6. An apparatus for detecting combustion conditions of an internal combustion engine according to claim 1, wherein said first crank angle detection means outputs the unit angle signal for each unit crank angle by detecting the teeth on the ring gear of a flywheel.

7. An apparatus for detecting combustion conditions of an internal combustion engine according to claim 1, wherein said period measurement timing modifying means modifies the count number of said unit angle signals in said period measurement timing setting means only when the absolute value of the difference between the reference value and the number of unit angle signals counted by said counting means is one.

8. An apparatus for detecting combustion conditions of an internal combustion engine according to claim 1, wherein said period measurement timing modifying means individually modifies the count number of said unit angle signals used for setting the period measurement timing for each reference angle.

9. A method of detecting combustion conditions of an internal combustion engine wherein there is provided first crank angle detection means for taking out from a crank shaft, a unit angle signal for each unit crank angle, and second crank angle detection means for taking out from a cam shaft, a reference angle signal for each reference piston position, said method including:

setting one period measurement timing for each generation interval of said reference angle signal by counting a predetermined number of said unit angle signals with the reference angle signal as a reference, detecting the combustion conditions of the engine based on the generation period of the period measurement timing, and modifying the count number of said unit angle signal used for setting said period measurement timing, corresponding to a difference between a reference value and a count number of said unit angle signals occurring from after said reference angle signal until the period measurement timing set following the subsequent reference angle signal, and wherein the result of subtracting a reference value from the count number of said unit angle signals occurring from after said reference angle signal until the period measurement timing set following the subsequent reference angle signal, is added to the count number of said unit angle signals used for setting said period measurement timing.

10. A method of detecting combustion conditions of an internal combustion engine according to claim 9, said method involving obtaining an average value for the count number of said unit angle signals occurring from after said reference angle signal until the period measurement timing set following the subsequent reference angle signal, and modifying the count number of said unit angle signals used for setting said period measurement timing, corresponding to a difference between said average value and a reference value.

11. A method of detecting combustion conditions of an internal combustion engine according to claim 9, wherein said reference value is the number of said unit angle signals counted from after said reference angle signal until the period measurement timing set following the subsequent reference angle signal, during a previous engine operation.

12. A method of detecting combustion conditions of an internal combustion engine according to claim 9, wherein when a difference occurs between the count number of said unit angle signals from after said reference angle signal until the period measurement timing set following the subsequent reference angle signal, and a reference value, the period measurement results until then are cleared.

13. A method of detecting combustion conditions of an internal combustion engine according to claim 9, wherein the top dead center is set as the period measurement timing.

14. A method of detecting combustion conditions of an internal combustion engine according to claim 9, wherein said first crank angle detection means outputs the unit angle signal for each unit crank angle by detecting the teeth on the ring gear of a flywheel.

15. A method of detecting combustion conditions of an internal combustion engine according to claim 9, wherein modification of the count number of said unit angle signals used for setting said period measurement timing is carried out only when the absolute value of the difference between the reference value and the count number of said unit angle signals occurring from after said reference angle signal until the period measurement timing set following the subsequent reference angle signal is one.

16. A method of detecting combustion conditions of an internal combustion engine according to claim 9, wherein the count number of the unit angle signals used for setting the period measurement timing for each reference angle, is individually modified for each reference angle signal.

17. An apparatus for detecting combustion conditions of an internal combustion engine comprising:

first crank angle detection means for taking out from a crank shaft, a unit angle signal for each unit crank angle, second crank angle detection means for taking out from a cam shaft, a reference angle signal for each reference piston position, period measurement timing setting means for setting one measurement timing period for each generation interval of said reference angle signal, by counting a predetermined number of said unit angle signals with said reference angle signal as a reference, period measurement means for measuring the generation period of said period measurement timing, combustion condition detection means for detecting the combustion conditions of the engine based on the period measured by said period measurement means, counting means for counting a generation number of said unit angle signals occurring from after said reference angle signal until the period measurement timing set following the subsequent reference angle signal, and period measurement timing modifying means for modifying the count number of said unit angle signals used for setting the period measurement timing in the period measurement timing setting means, corresponding to a difference between the number of unit angle signals counted by said counting means, and a reference value; and wherein a period clearing means is provided for clearing the accumulated period measurement results from said period measurement means, when a difference occurs between the number of unit angle signals counted by said counting means, and a reference value.

18. An apparatus for detecting combustion conditions of an internal combustion engine comprising:

first crank angle detection means for taking out from a crank shaft, a unit angle signal for each unit crank angle, second crank angle detection means for taking out from a cam shaft, a reference angle signal for each reference piston position, period measurement timing setting means for setting one measurement timing period for each generation interval of said reference angle signal, by counting a predetermined number of said unit angle signals with said reference angle signal as a reference, period measurement means for measuring the generation period of said period measurement timing, combustion condition detection means for detecting the combustion conditions of the engine based on the period measured by said period measurement means, counting means for counting a generation number of said unit angle signals occurring from after said reference angle signal until the period measurement timing set following the subsequent reference angle signal, and period measurement timing modifying means for modifying the count number of said unit angle signals used for setting the period measurement timing in the period measurement timing setting means, corresponding to a difference between the number of unit angle signals counted by said counting means, and a reference value; and wherein said period measurement timing modifying means modifies the count number of said unit angle signals in said period measurement timing setting means only when the absolute value of the difference between the reference value and the number of unit angle signals counted by said counting means is one.

19. A method of detecting combustion conditions of an internal combustion engine wherein there is provided first crank angle detection means for taking out from a crank shaft, a unit angle signal for each unit crank angle, and second crank angle detection means for taking out from a cam shaft, a reference angle signal for each reference piston position, said method including:

setting one period measurement timing for each generation interval of said reference angle signal by counting a predetermined number of said unit angle signals with the reference angle signal as a reference, detecting the combustion conditions of the engine based on the generation period of the period measurement timing, and modifying the count number of said unit angle signal used for setting said period measurement timing, corresponding to a difference between a reference value and a count number of said unit angle signals occurring from after said reference angle signal until the period measurement timing set following the subsequent reference angle signal, and wherein when a difference occurs between the count number of said unit angle signals from after said reference angle signal until the period measurement timing set following the subsequent reference angle signal, and a reference value, the period measurement results until then are cleared.

20. A method of detecting combustion conditions of an internal combustion engine wherein there is provided first crank angle detection means for taking out from a crank shaft, a unit angle signal for each unit crank angle, and second crank angle detection means for taking out from a cam shaft, a reference angle signal for each reference piston position, said method including:

setting one period measurement timing for each generation interval of said reference angle signal by counting a predetermined number of said unit angle signals with the reference angle signal as a reference, detecting the combustion conditions of the engine based on the generation period of the period measurement timing, and modifying the count number of said unit angle signal used for setting said period measurement timing, corresponding to a difference between a reference value and a count number of said unit angle signals occurring from after said reference angle signal until the period measurement timing set following the subsequent reference angle signal, and wherein modification of the count number of said unit angle signals used for setting said period measurement timing, is carried out only when the absolute value of the difference between the reference value and the count number of said unit angle signals occurring from after said reference angle signal until the period measurement timing set following the subsequent reference angle signal is one.

* * * * *